BEST AVAILABLE COPY

T857021

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 10, 1968

857 O.G. 368

688,343

CATALYTIC SYNTHESIS OF ALPHA,BETA-UNSATURATED NITRILES

Howard S. Young, % Tennessee Eastman Company, P.O. Box 511, Kingsport, Tenn. 37662

Filed Dec. 6, 1967. Published Dec. 10, 1968

Class 260—465.3

No Drawing. 18 Pages Specification

Process for the ammoxidative conversion of propylene to acrylonitrile comprising contacting a mixture of vaporized propylene, ammonia, and oxygen at a temperature of from about 300° C. to about 550° C. with a novel catalyst composition comprising oxidized molybdenum, oxidized bismuth, and at least one of oxidized niobium and oxidized tantalum. Acrylonitrile may be subsequently used in synthetic fibers, high impact resins, and as a major chemical intermediate.